(12) United States Patent
Nonaka et al.

(10) Patent No.: US 10,480,445 B2
(45) Date of Patent: Nov. 19, 2019

(54) GAS ENGINE DRIVE SYSTEM

(71) Applicant: KAWASAKI JUKOGYO KABUSHIKI KAISHA, Kobe-shi, Hyogo (JP)

(72) Inventors: Yosuke Nonaka, Himeji (JP); Tomoaki Kizuka, Takatsuki (JP); Satoru Fukao, Kobe (JP); Shigeharu Fujihara, Amagasaki (JP); Towa Hirayama, Kakogawa (JP); Hiroyoshi Ishii, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/775,113

(22) PCT Filed: Oct. 6, 2016

(86) PCT No.: PCT/JP2016/079827
§ 371 (c)(1),
(2) Date: May 10, 2018

(87) PCT Pub. No.: WO2017/081966
PCT Pub. Date: May 18, 2017

(65) Prior Publication Data
US 2018/0372017 A1    Dec. 27, 2018

(30) Foreign Application Priority Data
Nov. 10, 2015    (JP) .................... 2015-220070

(51) Int. Cl.
*F02D 29/06*     (2006.01)
*H02P 9/04*      (2006.01)
*F02D 41/30*     (2006.01)

(52) U.S. Cl.
CPC ............. *F02D 41/30* (2013.01); *F02D 29/06* (2013.01); *F02D 2200/0406* (2013.01);
(Continued)

(58) Field of Classification Search
CPC ...... F02D 41/30; F02D 41/3082; F02D 41/34; F02D 41/36
(Continued)

(56) References Cited

U.S. PATENT DOCUMENTS 3,303,348 A * 2/1967 Cox ................. F01D 17/00
                                                290/40 R
4,596,220 A * 6/1986 Oosuga ............ F02D 37/02
                                                 123/399
(Continued)

FOREIGN PATENT DOCUMENTS

DE   10 2004 060 905 A1    6/2006
EP        3 098 431 A1    11/2016
(Continued)

*Primary Examiner* — Tulsidas C Patel
*Assistant Examiner* — Thomas K Quigley
(74) *Attorney, Agent, or Firm* — Oliff PLC

(57) ABSTRACT

A gas engine drive system includes: a gas engine; a turbocharger including a compressor and a turbine connected to the gas engine; a fuel injection valve provided on the gas engine; a fuel supply line leading a fuel gas to the fuel injection valve, the fuel supply line having a pressure regulating valve; a first pressure meter detecting an intake air pressure; a second pressure meter detecting a fuel supply pressure being a pressure at a pressure regulating valve downstream side; and a controller controlling the pressure regulating valve such that a pressure difference between the fuel supply pressure and the intake air pressure is a target value. The controller changes the target value from a first to a second setting value higher than the first when a load on
(Continued)

the gas engine increases rapidly or when a calorific value of the fuel gas is less than a threshold.

10 Claims, 7 Drawing Sheets

(52) U.S. Cl.
CPC .............. *F02D 2200/0602* (2013.01); *F02D 2200/0611* (2013.01); *F02D 2200/1002* (2013.01); *F02D 2250/18* (2013.01)

(58) Field of Classification Search
USPC ...................................................... 290/40 C
See application file for complete search history.

(56) References Cited

U.S. PATENT DOCUMENTS

| | | | |
|---|---|---|---|
| 7,463,967 B2* | 12/2008 | Ancimer | F02D 19/10 123/480 |
| 2006/0225715 A1* | 10/2006 | Ohashi | F02M 21/047 123/590 |
| 2008/0099002 A1* | 5/2008 | Boyer | F02D 41/0027 123/679 |
| 2008/0127950 A1* | 6/2008 | Malm | F02B 43/10 123/527 |
| 2008/0208438 A1* | 8/2008 | Sukegawa | F02D 41/047 701/105 |
| 2009/0055077 A1* | 2/2009 | Schule | F02D 41/0027 701/103 |
| 2009/0076709 A1* | 3/2009 | Shiraishi | F02D 31/007 701/103 |
| 2010/0126170 A1* | 5/2010 | Nishio | F02M 21/047 60/611 |
| 2012/0310510 A1* | 12/2012 | Imamura | F02D 41/0027 701/104 |
| 2013/0000598 A1* | 1/2013 | Tokuoka | F02B 19/1023 123/254 |
| 2013/0220278 A1* | 8/2013 | Nishio | F02M 21/04 123/478 |
| 2016/0123266 A1* | 5/2016 | Otsubo | F02D 41/30 123/445 |
| 2016/0222902 A1* | 8/2016 | Otsubo | F02M 21/047 |

FOREIGN PATENT DOCUMENTS

| | | |
|---|---|---|
| JP | 2007-270782 A | 10/2007 |
| JP | 2011-132893 A | 7/2011 |
| JP | 2015-048834 A | 3/2015 |
| WO | 2012/053587 A1 | 4/2012 |

* cited by examiner

GAS ENGINE DRIVE SYSTEM

TECHNICAL FIELD

The present invention relates to a gas engine drive system including a gas engine and a turbocharger.

BACKGROUND ART

Conventionally, there is a known gas engine drive system including a gas engine and a turbocharger (see Patent Literature 1, for example). The turbocharger includes a compressor and a turbine that are connected to the gas engine. The gas engine is provided with a fuel injection valve, and a fuel gas is led to the fuel injection valve through a fuel supply line. The fuel supply line is provided with a pressure regulating valve. Generally speaking, the pressure regulating valve is controlled such that the pressure difference between the fuel supply pressure and intake air pressure is constant.

CITATION LIST

Patent Literature

PTL 1: Japanese Laid-Open Patent Application Publication No. 2011-132893

SUMMARY OF INVENTION

Technical Problem

In a case where the load on the gas engine increases rapidly or in a case where the calorific value of the fuel gas is low, the gas engine requires a large amount of fuel gas. However, the fuel injection period of the fuel injection valve has an upper limit. Therefore, when the load on the gas engine increases rapidly or when the calorific value of the fuel gas is low, there is a case where a necessary amount of fuel gas for obtaining a desired output of the gas engine cannot be injected.

In view of the above, an object of the present invention is to provide a gas engine drive system that is capable of obtaining a desired output of a gas engine in a case where the load on the gas engine increases rapidly or in a case where the calorific value of the fuel gas is low.

Solution to Problem

In order to solve the above-described problems, a gas engine drive system according to the present invention includes: a gas engine; a turbocharger including a compressor and a turbine that are connected to the gas engine; a fuel injection valve provided on the gas engine; a fuel supply line that leads a fuel gas to the fuel injection valve, the fuel supply line being provided with a pressure regulating valve; a first pressure meter that detects an intake air pressure that is a pressure of intake air fed from the compressor to the gas engine; a second pressure meter that detects a fuel supply pressure that is a pressure at a downstream side of the pressure regulating valve; and a controller that controls the pressure regulating valve such that a pressure difference between the fuel supply pressure detected by the second pressure meter and the intake air pressure detected by the first pressure meter is a target value. The controller changes the target value from a first setting value to a second setting value higher than the first setting value when a load on the gas engine increases rapidly or when a calorific value of the fuel gas is less than a threshold.

According to the above configuration, in a case where the load increases rapidly or in a case where the calorific value of the fuel gas is low, the pressure difference between the fuel supply pressure and the intake air pressure is increased, and thereby the fuel injection amount from the fuel injection valve per unit injection time can be increased. This makes it possible to inject a necessary amount of fuel gas for obtaining a desired output of the gas engine before the fuel injection period reaches its upper limit. Consequently, in the case where the load increases rapidly or in the case where the calorific value of the fuel gas is low, the desired output of the gas engine can be obtained.

When the load on the gas engine increases rapidly, the controller may change the target value from the first setting value to the second setting value, and when a predetermined time elapses after the rapid increase in the load on the gas engine, the controller may bring the target value back to the first setting value. According to this configuration, during normal operation after the rapid increase in the load, the gas engine can be kept operated at such a setting value that optimal performance of the gas engine is obtained.

When the calorific value of the fuel gas is less than the threshold, the controller may determine the second setting value such that the less the calorific value of the fuel gas, the greater the second setting value, and change the target value from the first setting value to the second setting value. According to this configuration, the fuel injection amount can be increased in accordance with decrease in the calorific value of the fuel gas. This makes it possible to maintain the output of the gas engine even if the calorific value of the fuel gas is low.

The above gas engine drive system may further include a calorific value meter that detects the calorific value of the fuel gas. The controller may change the target value from the first setting value to the second setting value when the calorific value of the fuel gas, which is detected by the calorific value meter, is less than the threshold. This configuration makes it possible to maintain the output of the gas engine even immediately after rapid change in the calorific value of the fuel gas.

The above gas engine drive system may further include: a power generator that is driven by the gas engine; and a power meter that detects electric power generated by the power generator. The controller may calculate the calorific value of the fuel gas based on the electric power detected by the power meter and a fuel injection amount from the fuel injection valve, and change the target value from the first setting value to the second setting value when the calculated calorific value is equal to or less than the threshold. This configuration makes it possible to maintain the output of the gas engine even immediately after rapid change in the calorific value of the fuel gas without using a calorific value meter.

The above gas engine drive system may further include a torque meter that detects an output torque of the gas engine. The controller may calculate the calorific value of the fuel gas based on the output torque of the gas engine, which is detected by the torque meter, and a fuel injection amount from the fuel injection valve, and change the target value from the first setting value to the second setting value when the calculated calorific value is equal to or less than the threshold. This configuration makes it possible to maintain the output of the gas engine even immediately after rapid change in the calorific value of the fuel gas without using a calorific value meter.

Advantageous Effects of Invention

The present invention makes it possible to obtain a desired output of the gas engine in a case where the load on the gas engine increases rapidly or in a case where the calorific value of the fuel gas is low.

DESCRIPTION OF EMBODIMENTS (Embodiment 1)

Figure 1:
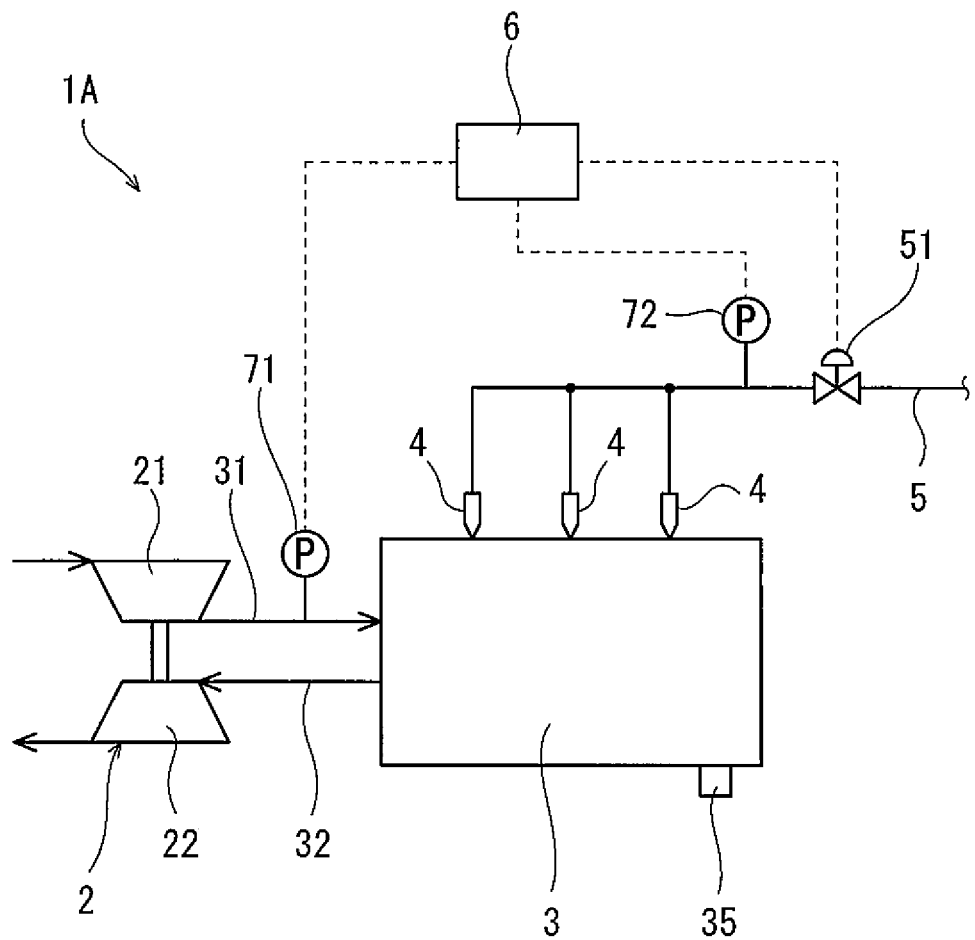
FIG. 1 shows a schematic configuration of a gas engine drive system according to Embodiment 1 of the present invention.

FIG. 1 shows a gas engine drive system 1A according to Embodiment 1 of the present invention. The system 1A includes a gas engine 3, a turbocharger 2, and a controller 6.

The gas engine 3 may be a pure gas engine that combusts only a fuel gas (e.g., natural gas), or may be a dual fuel engine that combusts one of or both a fuel gas and a fuel oil. In the present embodiment, the gas engine 3 is a 4-stroke engine. However, as an alternative, the gas engine 3 may be a 2-stroke engine. For example, the gas engine 3 may be used for power generation on the ground, or may be used as a main engine (electric-propulsion engine or mechanical-propulsion engine) of a ship.

The gas engine 3 includes a plurality of cylinders (not shown). The gas engine 3 is provided with a plurality of fuel injection valves 4 corresponding to the plurality of cylinders, respectively. A fuel gas is led to the fuel injection valves 4 through a fuel supply line 5.

In each cylinder, a piston reciprocates twice, and thereby one cycle of the gas engine 3 (intake, compression, expansion, and exhaust) is performed. The phase angle (0 to 720 degrees) of the gas engine 3 during one cycle of the cylinder is detected by a phase angle detector 35. For example, the rotation angle of a crank shaft (i.e., crank angle) or the position of the piston can be used as the phase angle. For example, the phase angle detector 35 is an electromagnetic pickup, a proximity switch, or a rotary encoder. The actual rotational speed of the gas engine 3 is also detected from the phase angle detector 35.

The turbocharger 2 includes: a compressor 21 connected to the gas engine 3 by an intake passage 31; and a turbine 22 connected to the gas engine 3 by an exhaust passage 32. The intake passage 31 leads intake air from the compressor 21 to all the cylinders of the gas engine 3, and the exhaust passage 32 leads exhaust gas from all the cylinders of the gas engine 3 to the turbine 22. The intake passage 31 is provided with a first pressure meter 71, which detects an intake air pressure that is the pressure of the intake air fed to the gas engine 3.

The aforementioned fuel supply line 5 is provided with a pressure regulating valve 51. The fuel supply line 5 is further provided with a second pressure meter 72, which detects a fuel supply pressure that is the pressure at the downstream side of the pressure regulating valve 51.

The controller 6 controls each of the fuel injection valves 4 based on the phase angle detected by the phase angle detector 35. The controller 6 performs PID control of the fuel injection valves 4 to adjust the actual rotational speed of the gas engine 3 to a target rotational speed. The controller 6 also controls the pressure regulating valve 51 such that a pressure difference $\Delta P$ between the fuel supply pressure detected by the second pressure meter 72 and the intake air pressure detected by the first pressure meter 71 is a target value PT.

Figure 2:
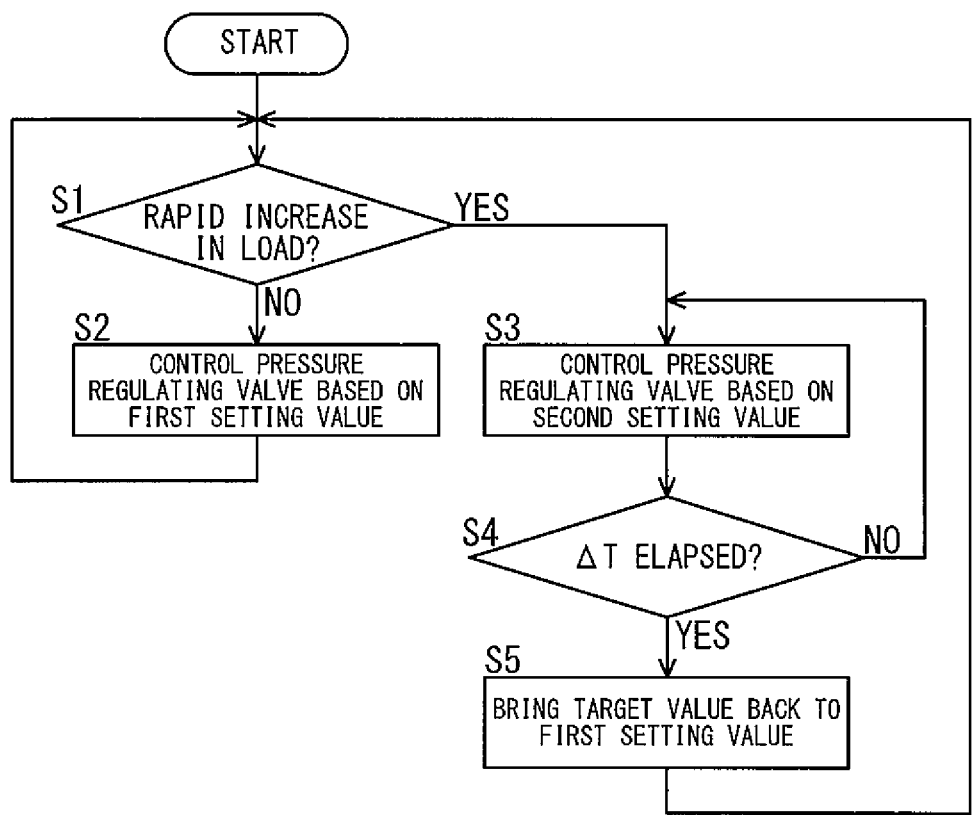
FIG. 2 is a flowchart of control performed by a controller in Embodiment 1.

Next, control of the pressure regulating valve 51 is described in detail with reference to FIG. 2.

The controller 6 determines whether or not the load increases rapidly (step S1). When the load does not increase rapidly (NO in step S1), the controller 6 adopts a first setting value P1 as the aforementioned target value PT, and controls the pressure regulating valve 51 based on the first setting value P1 (step S2). In other words, the controller 6 controls the pressure regulating valve 51 such that the pressure difference $\Delta P$ between the fuel supply pressure and the intake air pressure is the first setting value P1.

The determination whether or not the load increases rapidly can be made by various methods. Examples of adoptable methods are as follows.

(1) One example method includes: calculating the speed of increase in a necessary fuel injection amount; and determining that the load increases rapidly if the speed of increase in the necessary fuel injection amount is higher than a threshold, and determining that the load does not increase rapidly if the speed of increase in the necessary fuel injection amount is lower than the threshold.

(2) Another example method includes: calculating a deviation between the actual rotational speed and the target rotational speed; and determining that the load increases rapidly if the deviation between the actual rotational speed and the target rotational speed is greater than a threshold, and determining that the load does not increase rapidly if the deviation between the actual rotational speed and the target rotational speed is less than the threshold.

(3) Yet another example method includes: detecting the output torque of the gas engine 3 by a torque meter and calculating the speed of increase in the output torque; and determining that the load increases rapidly if the speed of increase in the output torque is higher than a threshold, and determining that the load does not increase rapidly if the speed of increase in the output torque is lower than the threshold.

When the load increases rapidly (YES in step S1), the controller 6 adopts a second setting value P2, which is higher than the first setting value P1, as the aforementioned target value PT, and controls the pressure regulating valve 51 based on the second setting value P2 (step S3). In other words, the controller 6 controls the pressure regulating valve 51 such that the pressure difference ΔP between the fuel supply pressure and the intake air pressure is the second setting value P2. That is, when the load increases rapidly, the controller 6 changes the target value PT of the pressure difference ΔP between the fuel supply pressure and the intake air pressure from the first setting value P1 to the second setting value P2.

For example, the first setting value P1 is 0.05 to 0.08 MPa; the second setting value P2 is 0.1 to 0.2 MPa; and the difference between the first setting value P1 and the second setting value P2 is 0.05 to 0.15 MPa.

Then, until a predetermined time ΔT elapses after the rapid increase in the load (NO in step S4), the controller 6 controls the pressure regulating valve 51 based on the second setting value P2, and when the predetermined time ΔT elapses after the rapid increase in the load (YES in step S4), the controller 6 brings the target value PT of the pressure difference ΔP between the fuel supply pressure and the intake air pressure back to the first setting value P1 (step S5). Thereafter, the flow returns to step S1.

Desirably, when the load does not increase rapidly (i.e., in step S2), the controller 6 slowly changes the degree of opening of the pressure regulating valve 51, and when the load increases rapidly (i.e., in step S3), the controller 6 quickly changes the degree of opening of the pressure regulating valve 51.

Figure 3A:
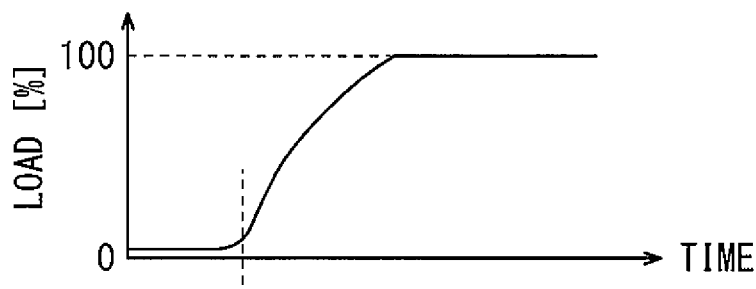
FIG. 3A is a graph showing temporal changes in the load on a gas engine.
Figure 3B:
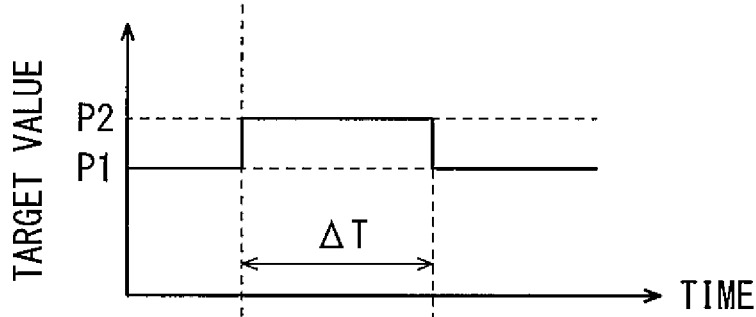
FIG. 3B is a graph showing temporal changes in a target value of a pressure difference between a fuel supply pressure and an intake air pressure.
Figure 3C:
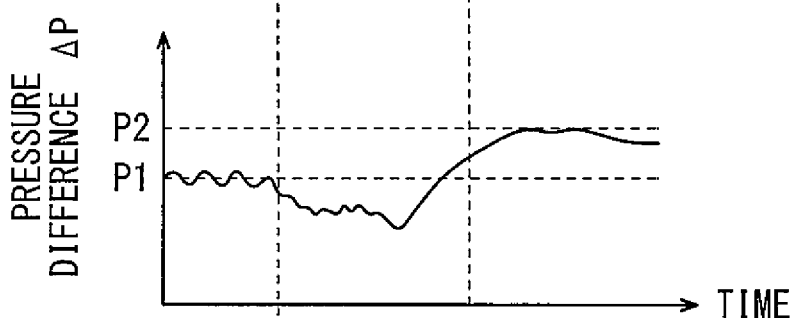
FIG. 3C is a graph showing temporal changes in the pressure difference.
Figure 3D:
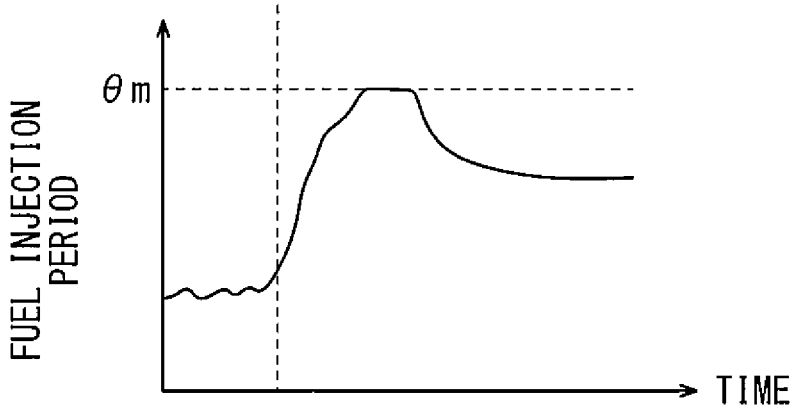
FIG. 3D is a graph showing temporal changes in a fuel injection period.

As one example, assume that the load of the gas engine 3 increases rapidly from about 0% to 100% as shown in FIG. 3A. At the time, the target value PT, the pressure difference ΔP, and the fuel injection period transition as shown in FIGS. 3B to 3D.

As described above, in the gas engine drive system 1A according to the present embodiment, in a case where the load increases rapidly, the pressure difference ΔP between the fuel supply pressure and the intake air pressure is increased, and thereby the fuel injection amount from the fuel injection valves per unit injection time can be increased. This makes it possible to inject a necessary amount of fuel gas for obtaining a desired output of the gas engine 3 before the fuel injection period reaches its upper limit θm (e.g., 150 degrees). Consequently, in the case where the load increases rapidly, the desired output of the gas engine 3 can be obtained. Even in a case where the fuel injection period reaches the upper limit θm as shown in FIG. 3D, since the pressure difference ΔP is increased, a larger amount of fuel gas can be injected. Thus, in cases where the load increases rapidly, the possibility of obtaining a desired output of the gas engine 3 is increased.

Moreover, when the predetermined time ΔT elapses after the rapid increase in the load of the gas engine 3, the target value PT is brought back from the second setting value P2 to the first setting value P1. Therefore, during normal operation after the rapid increase in the load, the gas engine 3 can be kept operated at such a setting value that optimal performance of the gas engine 3 is obtained.

(Embodiment 2)

Figure 4:
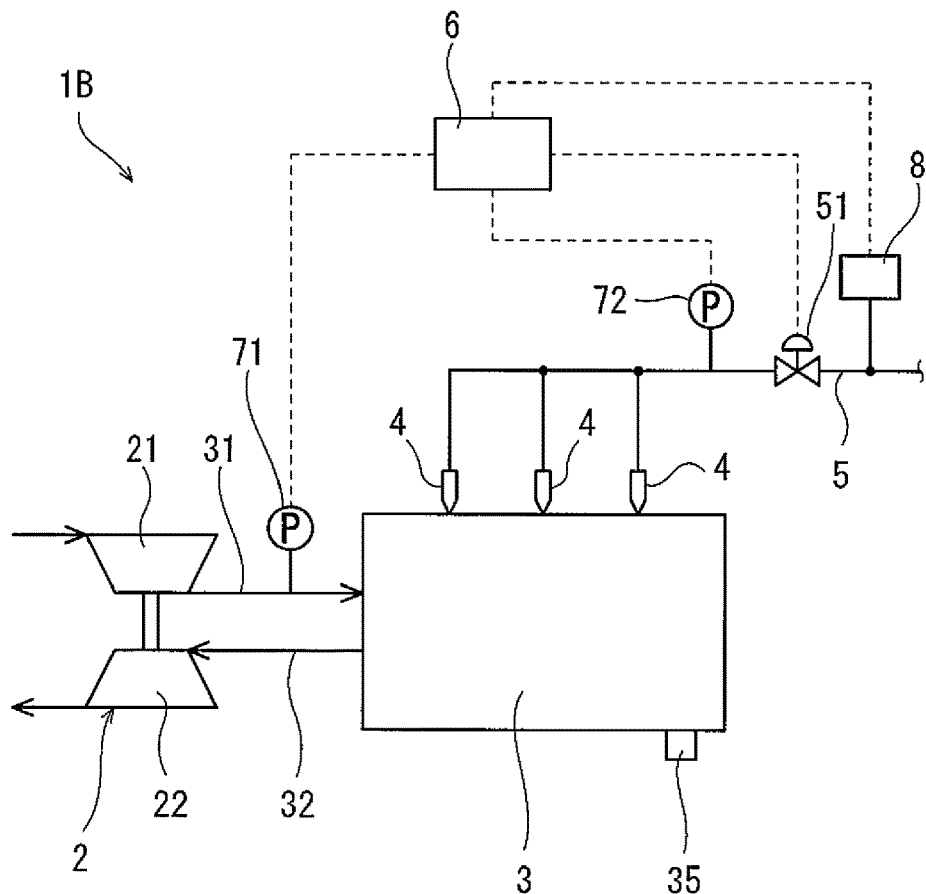
FIG. 4 shows a schematic configuration of a gas engine drive system according to Embodiment 2 of the present invention.

Next, a gas engine drive system 1B according to Embodiment 2 of the present invention is described with reference to FIG. 4 and FIG. 5. It should be noted that, in the present embodiment and the following Embodiment 3, the same components as those described in Embodiment 1 are denoted by the same reference signs as those used in Embodiment 1, and repeating the same descriptions is avoided.

In the present embodiment, the fuel supply line 5 is provided with a calorific value meter 8, which detects the calorific value Q of the fuel gas (e.g., unit: $J/Nm^3$). The calorific value meter 8 may be of a sampling type or an online type.

Figure 5:
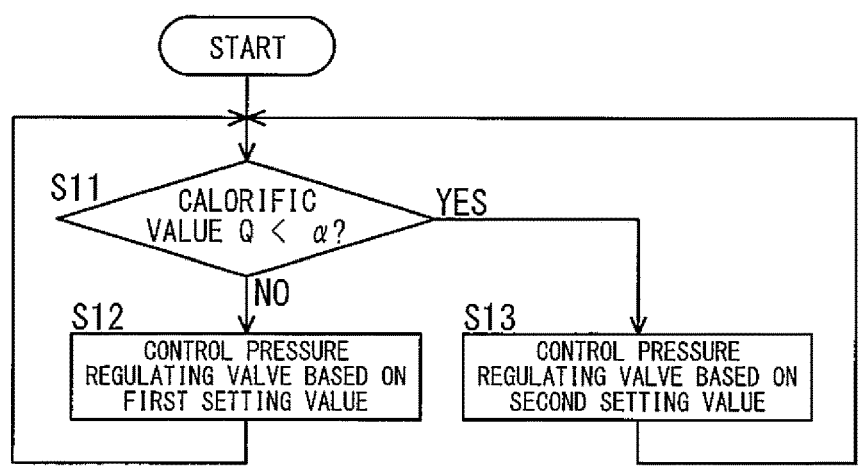
FIG. 5 is a flowchart of control performed by the controller in Embodiment 2.

As shown in FIG. 5, first, the controller 6 compares the calorific value Q of the fuel gas, which is detected by the calorific value meter 8, with a threshold α (step S11). If the calorific value Q is greater than the threshold α (NO in step S11), the controller 6 adopts the first setting value P1 as the aforementioned target value PT, and controls the pressure regulating valve 51 based on the first setting value P1 (step S12). In other words, the controller 6 controls the pressure regulating valve 51 such that the pressure difference ΔP between the fuel supply pressure and the intake air pressure is the first setting value P1.

On the other hand, if the calorific value Q is less than the threshold α (YES in step S11), the controller 6 adopts the second setting value P2, which is higher than the first setting value P1, as the target value PT, and controls the pressure regulating valve 51 based on the second setting value P2 (step S13). In other words, the controller 6 controls the pressure regulating valve 51 such that the pressure difference ΔP between the fuel supply pressure and the intake air pressure is the second setting value P2. That is, when the calorific value Q is less than the threshold α, the controller 6 changes the target value PT of the pressure difference ΔP between the fuel supply pressure and the intake air pressure from the first setting value P1 to the second setting value P2.

Figure 6:
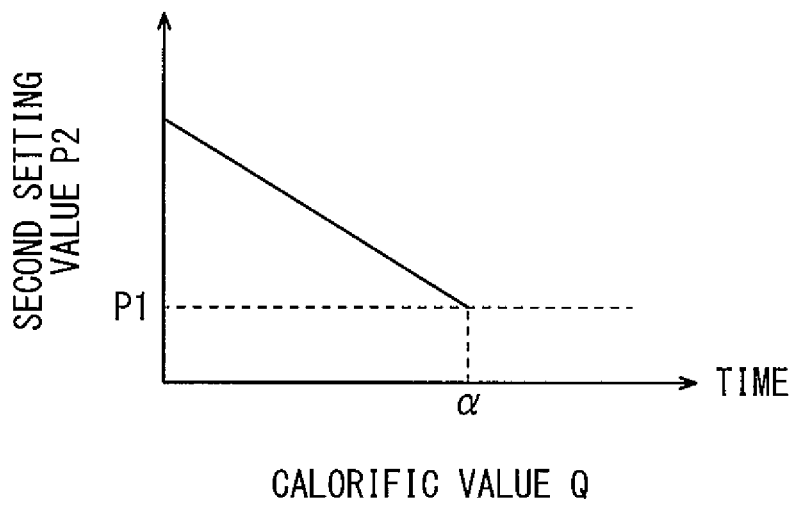
FIG. 6 shows a relationship between a calorific value and a second setting value.

For example, the first setting value P1 is 0.05 to 0.07 MPa. The controller 6 prestores therein a map in which the second setting value P2 is defined in association with the calorific value Q. As shown in FIG. 6, the present embodiment adopts a map in which the second setting value P2 increases in accordance with decrease in the calorific value Q of the fuel gas. Accordingly, when adopting the second setting value P2 in step S13, the controller 6 determines the second setting value P2 such that the less the calorific value Q of the fuel gas, the greater the second setting value P2. For example, within a particular range of the calorific value Q, the second setting value P2 decreases linearly from its maximum value (e.g., 0.1 to 0.2 MPa) to the first setting value P1.

Figure 7A:
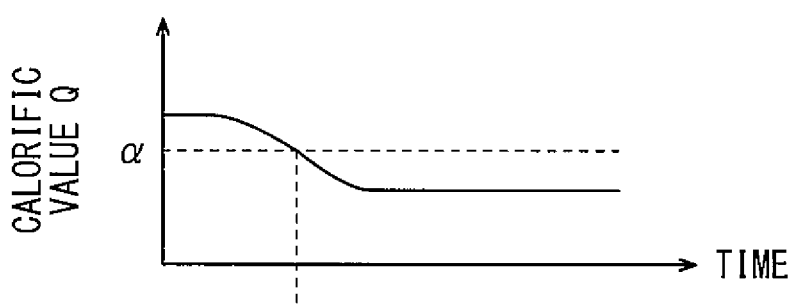
FIG. 7A is a graph showing temporal changes in the calorific value.
Figure 7B:
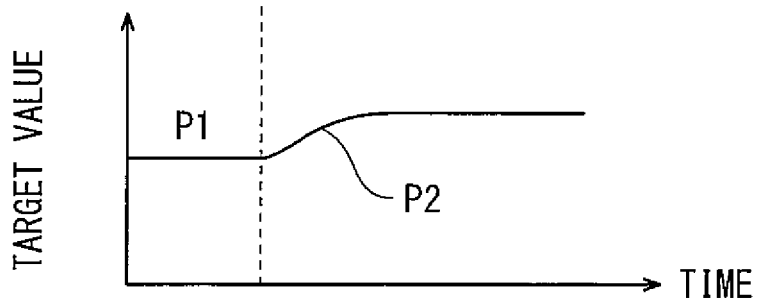
FIG. 7B is a graph showing temporal changes in the target value of the pressure difference between the fuel supply pressure and the intake air pressure.

As one example, assume that the calorific value Q of the fuel gas decreases from a value greater than the threshold a to a value less than the threshold a as shown in FIG. 7A. At the time, the target value PT transitions as shown in FIG. 7B.

As described above, in the gas engine drive system 1B of the present embodiment, in a case where the calorific value Q of the fuel gas is low, the pressure difference ΔP between the fuel supply pressure and the intake air pressure is increased, and thereby the fuel injection amount from the fuel injection valves 4 per unit injection time can be increased. This makes it possible to inject a necessary amount of fuel gas for obtaining a desired output of the gas engine 3 before the fuel injection period reaches its upper limit. Consequently, in the case where the calorific value Q of the fuel gas is low, the desired output of the gas engine 3 can be obtained. Even in a case where the fuel injection period reaches the upper limit, since the pressure difference ΔP is increased, a larger amount of fuel gas can be injected. Thus, in cases where the calorific value of the fuel gas is low, the possibility of obtaining a desired output of the gas engine 3 is increased.

Moreover, the second setting value P2 is determined such that the less the calorific value Q of the fuel gas, the greater the second setting value P2. Therefore, the fuel injection amount can be increased in accordance with decrease in the calorific value Q of the fuel gas. This makes it possible to maintain the output of the gas engine 3 even if the calorific value Q of the fuel gas is low.

Furthermore, in the present embodiment, when the calorific value Q of the fuel gas, which is detected by the calorific value meter 8, is less than the threshold α, the target value PT is changed from the first setting value P1 to the second setting value P2. This makes it possible to maintain the output of the gas engine 3 even immediately after rapid change in the calorific value Q of the fuel gas.

(Embodiment 3)

Figure 8:
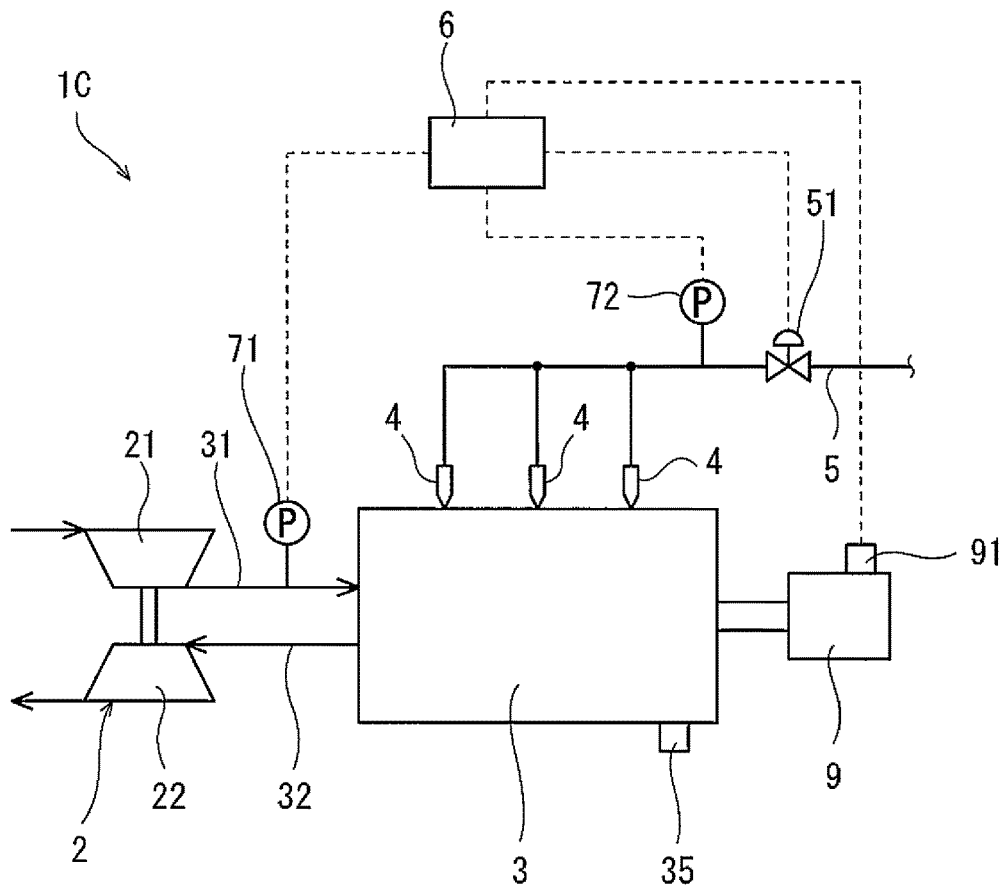
FIG. 8 shows a schematic configuration of a gas engine drive system according to Embodiment 3 of the present invention.

Next, a gas engine drive system 1C according to Embodiment 3 of the present invention is described with reference to FIG. 8 and FIG. 9.

In the present embodiment, similar to Embodiment 2, when the calorific value Q of the fuel gas is less than the threshold α, the target value PT of the pressure difference ΔP between the fuel supply pressure and the intake air pressure is changed from the first setting value P1 to the second setting value P2. However, the present embodiment does not include the calorific value meter 8. Instead, the gas engine 3 drives a power generator 9, and electric power generated by the power generator 9 is detected by a power meter 91.

Figure 9:
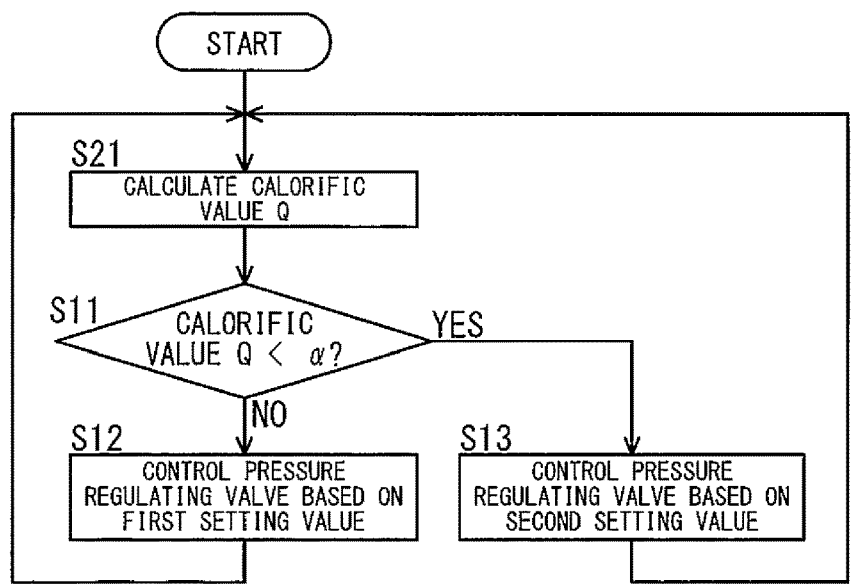
FIG. 9 is a flowchart of control performed by the controller in Embodiment 3.

As shown in FIG. 9, in the present embodiment, before step S11 described in Embodiment 2, the controller 6 calculates the calorific value Q of the fuel gas based on the electric power detected by the power meter 91 and the fuel injection amount from the fuel injection valves 4 (step S21). Thereafter, the same processes as those performed in Embodiment 2 are performed.

Figure 10:
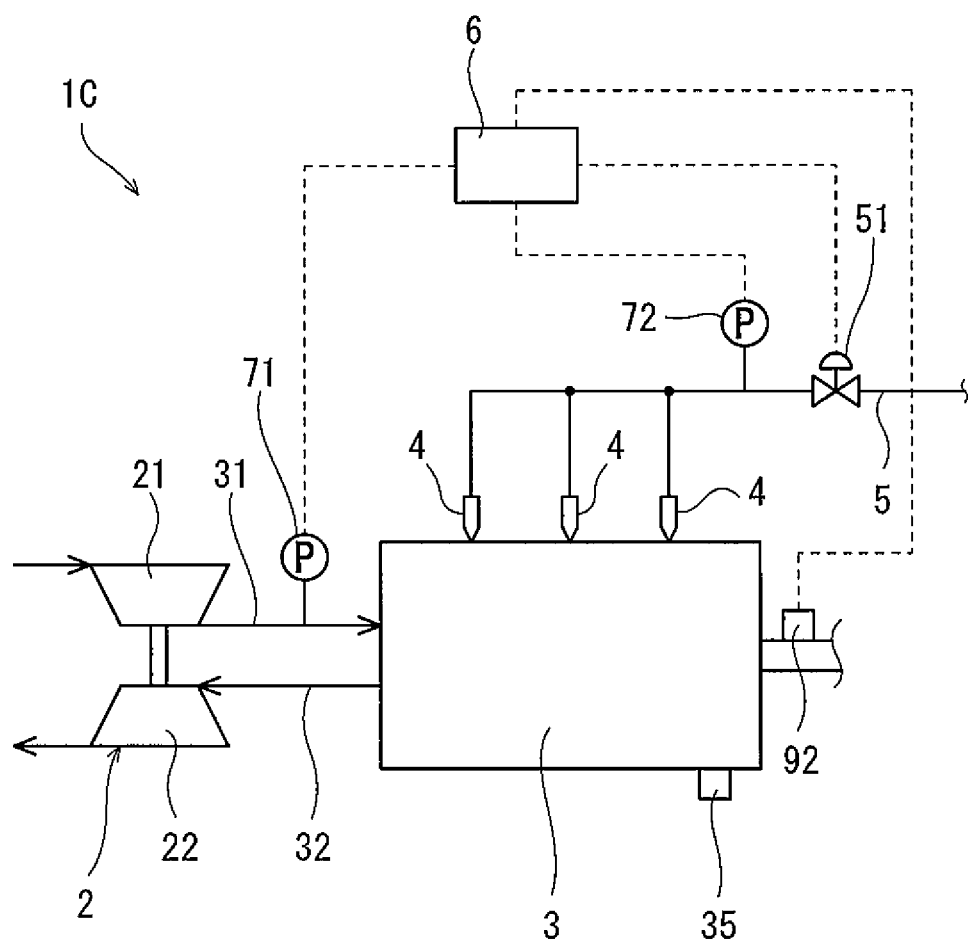
FIG. 10 shows a schematic configuration of a gas engine drive system according to one variation of Embodiment 3.

The present embodiment provides the same advantageous effects as those provided by Embodiment 2. It should be noted that, as shown in FIG. 10, a torque meter 92, which detects the output torque of the gas engine 3, may be provided instead of the power generator 9 and the power meter 91, and the calorific value Q of the fuel gas can be calculated based on the output torque of the gas engine 3, which is detected by the torque meter 92, and the fuel injection amount.

(Other Embodiments)

The present invention is not limited to the above-described Embodiments 1 to 3. Various modifications can be made without departing from the spirit of the present invention.

For example, Embodiment 1 may be combined with Embodiment 2 or 3. That is, the controller 6 may perform both the determination of step S1 shown in FIG. 2 and the determination of step S11 shown in FIG. 5 and FIG. 9.

REFERENCE SIGNS LIST 1A to 1C gas engine drive system
3 gas engine
4 fuel injection valve
5 fuel supply line
51 pressure regulating valve
6 controller
71 first pressure meter
72 second pressure meter
8 calorific value meter
9 power generator
91 power meter
92 torque meter

The invention claimed is:

1. A gas engine drive system comprising:
a gas engine;
a turbocharger including a compressor and a turbine that are connected to the gas engine;
a fuel injection valve provided on the gas engine;
a fuel supply line that leads a fuel gas to the fuel injection valve, the fuel supply line being provided with a pressure regulating valve;
a first pressure meter that detects an intake air pressure that is a pressure of intake air fed from the compressor to the gas engine;
a second pressure meter that detects a fuel supply pressure that is a pressure at a downstream side of the pressure regulating valve; and
a controller that controls the pressure regulating valve such that a pressure difference between the fuel supply pressure detected by the second pressure meter and the intake air pressure detected by the first pressure meter is a target value, wherein
the controller changes the target value from a first setting value to a second setting value higher than the first setting value when a calorific value of the fuel gas is less than a threshold.

2. The gas engine drive system according to claim 1, wherein
when the calorific value of the fuel gas is less than the threshold, the controller determines the second setting value such that the less the calorific value of the fuel gas, the greater the second setting value.

3. The gas engine drive system according to claim 1, further comprising a calorific value meter that detects the calorific value of the fuel gas.

4. The gas engine drive system according to claim 1, further comprising:
a power generator that is driven by the gas engine; and
a power meter that detects electric power generated by the power generator, wherein
the controller calculates the calorific value of the fuel gas based on the electric power detected by the power meter and a fuel injection amount from the fuel injection valve, and changes the target value from the first setting value to the second setting value when the calculated calorific value is equal to or less than the threshold.

5. The gas engine drive system according to claim 1, further comprising a torque meter that detects an output torque of the gas engine, wherein
the controller calculates the calorific value of the fuel gas based on the output torque of the gas engine, which is detected by the torque meter, and a fuel injection amount from the fuel injection valve, and changes the target value from the first setting value to the second setting value when the calculated calorific value is equal to or less than the threshold.

6. The gas engine drive system according to claim 2, further comprising a calorific value meter that detects the calorific value of the fuel gas.

7. The gas engine drive system according to claim 2, further comprising:
a power generator that is driven by the gas engine; and
a power meter that detects electric power generated by the power generator, wherein
the controller calculates the calorific value of the fuel gas based on the electric power detected by the power meter and a fuel injection amount from the fuel injection valve, and changes the target value from the first setting value to the second setting value when the calculated calorific value is equal to or less than the threshold.

8. The gas engine drive system according to claim 2, further comprising a torque meter that detects an output torque of the gas engine, wherein
the controller calculates the calorific value of the fuel gas based on the output torque of the gas engine, which is detected by the torque meter, and a fuel injection amount from the fuel injection valve, and changes the target value from the first setting value to the second setting value when the calculated calorific value is equal to or less than the threshold.

9. A gas engine drive system comprising:
a gas engine;
a turbocharger including a compressor and a turbine that are connected to the gas engine;
a fuel injection valve provided on the gas engine;
a fuel supply line that leads a fuel gas to the fuel injection valve, the fuel supply line being provided with a pressure regulating valve;
a first pressure meter that detects an intake air pressure that is a pressure of intake air fed from the compressor to the gas engine;
a second pressure meter that detects a fuel supply pressure that is a pressure at a downstream side of the pressure regulating valve; and
a controller that controls the pressure regulating valve such that a pressure difference between the fuel supply pressure detected by the second pressure meter and the intake air pressure detected by the first pressure meter is a target value, wherein
the controller changes the target value from a first setting value to a second setting value higher than the first setting value when the controller determines by any one of (i) a first determination method, (ii) a second determination method, and (iii) a third determination method that a load on the gas engine increases rapidly,
the first determination method includes:
calculating a speed of increase in a necessary fuel injection amount; and
determining that the load on the gas engine increases rapidly if the speed of increase in the necessary fuel injection amount is higher than a threshold, and determining that the load on the gas engine does not increase rapidly if the speed of increase in the necessary fuel injection amount is lower than the threshold,
the second determination method includes:
calculating a deviation between an actual rotational speed and a target rotational speed; and
determining that the load on the gas engine increases rapidly if the deviation between the actual rotational speed and the target rotational speed is greater than a threshold, and determining that the load on the gas engine does not increase rapidly if the deviation between the actual rotational speed and the target rotational speed is less than the threshold, and
the third determination method includes:
detecting an output torque of the gas engine by a torque meter and calculating a speed of increase in the output torque; and
determining that the load on the gas engine increases rapidly if the speed of increase in the output torque is higher than a threshold, and determining that the load on the gas engine does not increase rapidly if the speed of increase in the output torque is lower than the threshold.

10. The gas engine drive system according to claim 9, wherein
when a predetermined time elapses after the rapid increase in the load on the gas engine, and the controller has changed the target value from the first setting value to the second setting value, the controller changes the target value from the second setting value back to the first setting value.

* * * * *